United States Patent
Aizawa

(12) 
(10) Patent No.: US 6,201,524 B1
(45) Date of Patent: Mar. 13, 2001

(54) PORTABLE INFORMATION TERMINAL AND INFORMATION SCROLLING METHOD FOR USE THEREWITH

(75) Inventor: Masatoshi Aizawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/198,275

(22) Filed: Nov. 24, 1998

(30) Foreign Application Priority Data

Nov. 26, 1997 (JP) .................................................. 9-324232

(51) Int. Cl.$^7$ ...................................................... H04B 1/38
(52) U.S. Cl. ........................... 345/123; 345/146; 345/169; 345/352; 345/902; 455/556; 455/566; 455/575
(58) Field of Search ..................................... 345/123, 146, 345/169, 352, 902; 455/312, 313, 90, 556, 566, 575

(56) References Cited

U.S. PATENT DOCUMENTS 5,436,954 * 7/1995 Nishiyama et al. .................. 455/566
5,739,744 * 4/1998 Roca et al. .............................. 341/20
5,761,610 * 6/1998 Sorensen et al. ..................... 455/575
5,964,821 * 10/1999 Brunts et al. ......................... 701/201
5,999,827 * 12/1999 Sudo et al. ............................ 455/564

* cited by examiner

Primary Examiner—Bipin Shalwala
Assistant Examiner—Vincent E. Kovalick
(74) Attorney, Agent, or Firm—Jay H. Maioli

(57) ABSTRACT

A portable information terminal and an information scrolling method for use therewith. The terminal is typically a pager including a receiver connected to an antenna, a demodulator, a CPU, a ROM, a RAM, a key input unit, a rotary dial, a rotary dial controller, an LCD panel, an LCD panel driver, an alarm sound output unit and a speaker. Operating the rotary dial in simplified steps allows information to be displayed in a preferred scroll mode and scrolled in a desired direction on the LCD panel.

6 Claims, 4 Drawing Sheets

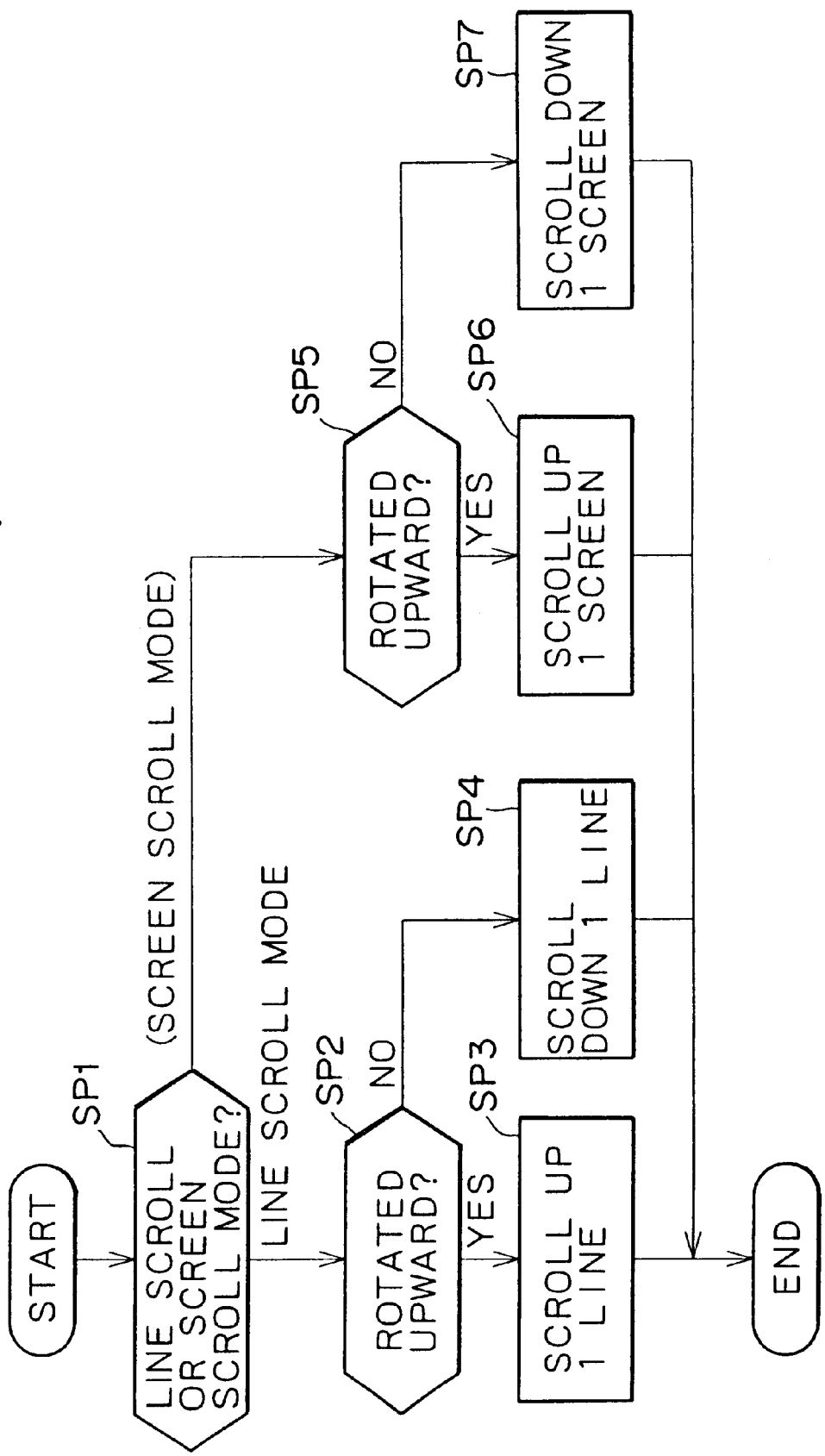

PORTABLE INFORMATION TERMINAL AND INFORMATION SCROLLING METHOD FOR USE THEREWITH

BACKGROUND OF THE INVENTION

1. Field of the Invention

The present invention relates to portable information terminals such as a pager and a radio receiver capable of receiving FM multichannel character broadcasting, and to an information scrolling method for use with such terminals. More particularly, the invention relates to a portable information terminal equipped with a rotary dial for scrolling displayed information on the basis of an information scrolling method for use with that terminal.

2. Background of the Invention

In recent years, advances in telecommunication technology and increasing user needs for mobile communication have brought about a phenomenal growth of portable information terminals such as portable telephones, personal handyphone systems (PHS), pagers, and radio receivers capable of receiving FM multichannel character broadcasting. Hybrid products each combining some of these features are already on the market.

The pager is a typical portable information terminal that has gained widespread use as a means of communication for transmitting and receiving desired messages (via operator) as well as for paging the holder of the device. Typically, the pager has a display unit for displaying a received message. The display unit generally functions in one of two scroll modes: line scroll mode in which the received message is scrolled one line at a time, and screen scroll mode in which the message is scrolled screen by screen.

A scroll mode of the pager is selected illustratively as follows: line scroll mode is set to one control key and screen scroll mode is assigned to another control key in advance. In operation, either of the two control keys is operated to invoke either line scroll mode or screen scroll mode.

Because the pager has only a limited number of control keys, information scroll is generally permitted in the downward direction only. However, users feel constrained and inconvenient when required to scroll information in the single direction alone; information should preferably be scrolled up and down to afford users enhanced convenience.

It is therefore an object of the present invention to overcome the above and other deficiencies of the prior art and to provide a portable information terminal and an information scrolling method for use therewith, whereby either line scroll mode or screen scroll mode is selected efficiently without additional provision of control keys and whereby screen scroll is effected both up and down for improved convenience of users.

Other objects, features and advantages of the invention will become more apparent upon a reading of the following description and appended drawings.

BRIEF DESCRIPTION OF THE DRAWINGS

FIG. 4 is a flowchart of steps constituting a method for controlling information scroll on the inventive portable information terminal.

DESCRIPTION OF THE PREFERRED EMBODIMENTS

Preferred embodiments of this invention will now be described with reference to the accompanying drawings.

Figure 1:
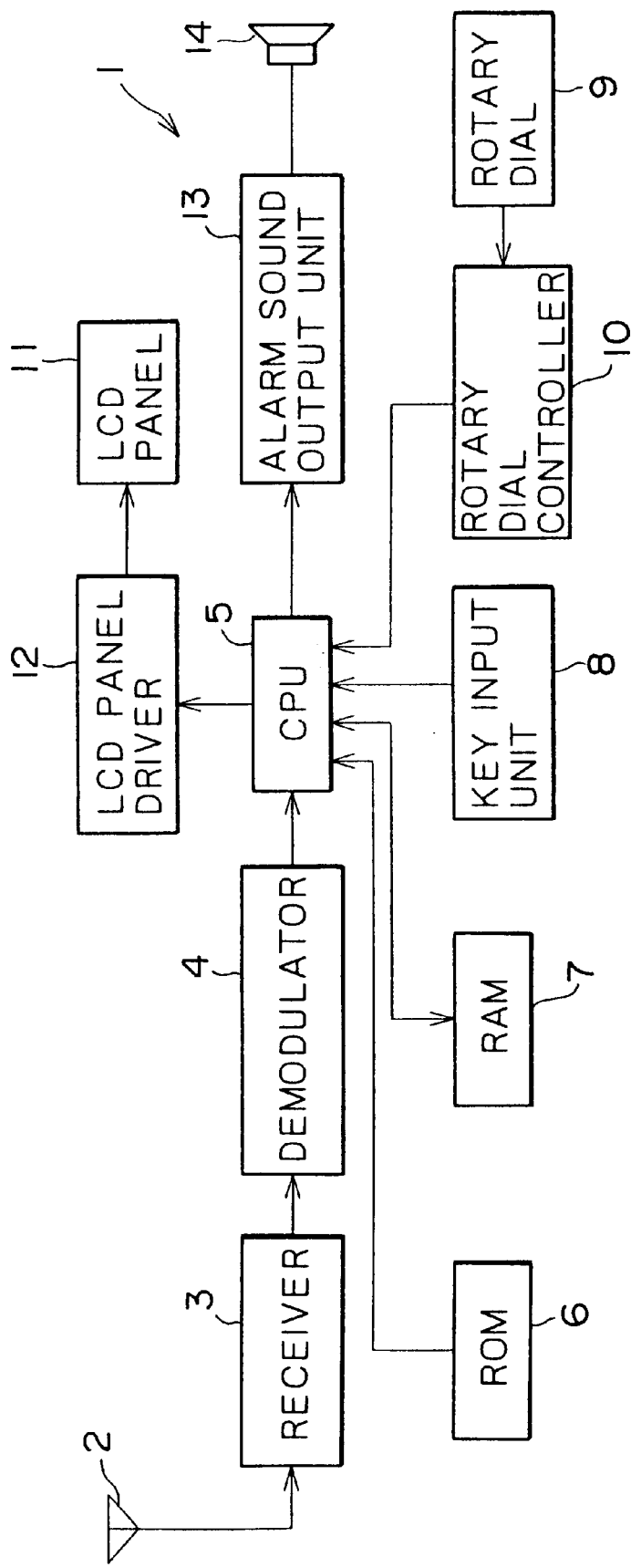
FIG. 1 is a block circuit diagram of a portable information terminal embodying the invention.

A typical circuit constitution of a portable information terminal embodying the invention is described below by referring to FIG. 1. FIG. 1 is a block circuit diagram of a pager that is representative of the portable information terminal according to the invention.

As shown in FIG. 1, the pager 1 comprises a receiver 3 connected to an antenna 2, a demodulator 4, a CPU 5 acting as controlling means, memories (ROM 6, RAM 7), a key input unit 8 such as a dialing device, a rotary dial 9, a rotary dial controller 10, a liquid crystal display (LCD) panel 11, an LCD panel driver 12, an alarm sound output unit 13, and a speaker 14.

Below is a description of how the portable information terminal of the above constitution operates.

The receiver 3 is illustratively a superheterodyne. The demodulator 4 is composed of a binary or quadruple FSK (frequency shift keying) demodulation circuit. On receiving from an operator (base station) a message matching the pager's own address held in the ROM 6, the demodulator 4 demodulates the message and sends the obtained message data to the CPU 5. In turn, the CPU 5 supplies an output signal to the alarm sound output unit 13.

Given an output signal from the alarm sound output unit 13, the speaker 14 informs the pager holder by alarm sound that the pager 1 is being called. Alternatively, a light-emitting diode (LED) may be provided so as to notify the pager holder by light that he or she is being paged.

The ROM 6 stores various processing programs. One such program is a processing program according to the invention (the program will be discussed later in detail). The RAM 7 serves as a work area for the CPU 5 and accommodates the message data demodulated by the demodulator 4.

The CPU 5 performs diverse processing programs held in the ROM 6 and effects necessary controls in response to the operations on the key input unit 8 and rotary dial 9. If the key input unit 8 or rotary dial 9 is operated to designate message data reproduction, the CPU 5 converts to character data the message data stored in the RAM 7 and supplies the converted data to the LCD panel driver 12.

The LCD panel driver 12 converts the received character data into display data destined for the LCD panel 11. Upon receipt of the display data, the LCD panel 11 displays a message (i.e., character information) corresponding to the supplied display data.

Figure 2:
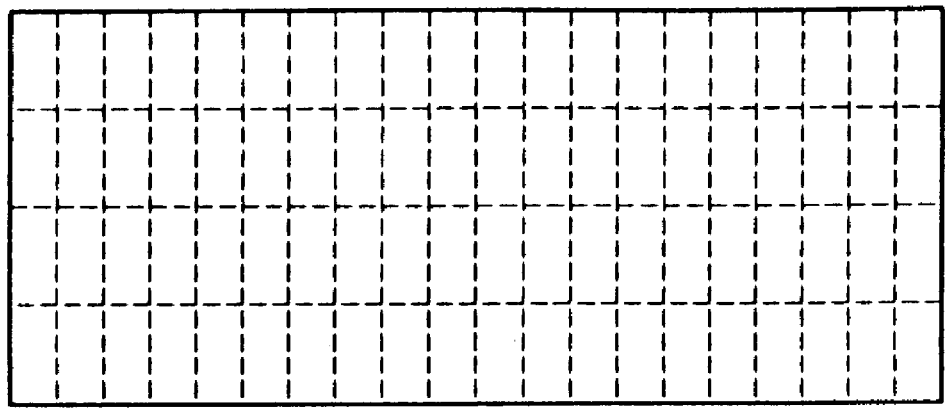
FIG. 2 is an explanatory view showing a display screen on the inventive portable information terminal.

As shown in FIG. 2, the LCD panel 11 illustratively has a character display area that displays four lines of 20 characters each (i.e., 80-character information). The received message is displayed in this area. The data representing the received message are saved in the RAM 7. When necessary, the saved message data are called up and displayed on the LCD panel 11 by operation of the key input unit 8 or rotary dial 9. By taking a look at a message on the LCD panel 11 in this manner, the pager holder can verify any message that may have reached the pager 1 so far.

Figure 3:
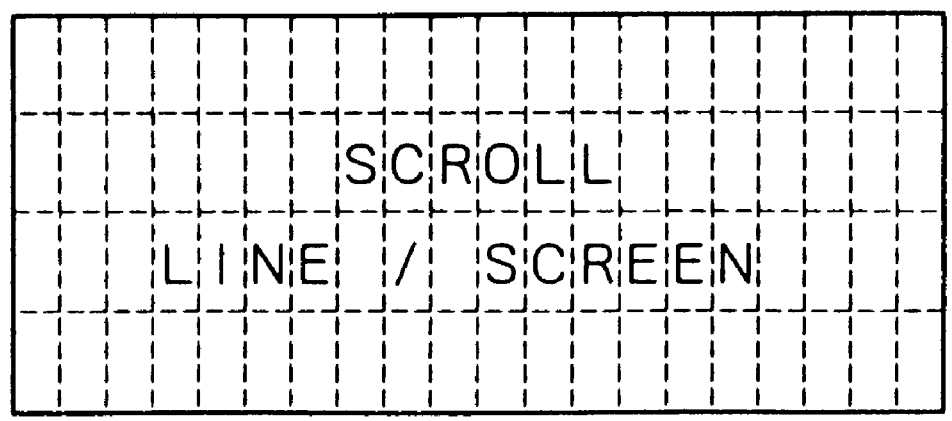
FIG. 3 is an explanatory view illustrating a scroll mode setting screen on the inventive portable information terminal.

The message scroll mode for this pager 1 is selected simply by operating the rotary dial 9. As shown in FIG. 3, there are line scroll (LINE) and screen scroll (SCREEN) to choose from.

Illustratively, rotating upward a rotating part (not shown) of the rotary dial 9 selects line scroll; rotating downward the rotating part selects screen scroll. After the desired scroll mode is selected by thus operating the rotating part of the rotary dial 9, a push on the rotary dial 9 in the vertical direction (switch on) establishes the selected scroll mode. Information about the established scroll mode is placed into the RAM 7.

Described below with reference to FIGS. 1 and 4 is an inventive method for controlling screen scroll on the portable information terminal according to the invention. FIG. 4 is a flowchart of steps constituting the scroll controlling method for use with the portable information terminal. In FIG. 4, reference character SP denotes processing steps.

Briefly, this portable information terminal has its rotary dial operated to select a scroll mode and a direction of scroll. The steps to achieve these functions are outlined below.

A rotating action of the rotating part of the rotary dial 9 is recognized by the CPU 5 of the pager 1 as an interruption from the rotary dial controller 10. The CPU 5 initiates a scrolling process by reading rotation information about the rotating part from the rotary dial controller 10.

In step SP1, a check is made on the scroll mode information held in the RAM 7 to verify whether line scroll or screen scroll is designated. If line scroll is found to be selected in step SP1, step SP2 is reached.

In step SP2, the rotating direction of line scroll is judged. If the direction is judged to be upward ("YES" in step SP2), then step SP3 is reached in which one line is scrolled up. If the direction is judged to be downward ("NO" in step SP2), step SP4 is reached and one line is scrolled down.

If screen scroll is found to be selected in step SP1, step SP5 is reached. In step SP5, the rotating direction of screen scroll is judged. If the direction is judged to be upward ("YES" in step SP5), step SP6 is reached in which one screen is scrolled up; if the direction is judged to be downward ("NO" in step SP5), then step SP7 is reached and one screen is scrolled down. In this manner, the inventive screen scroll controlling method allows the desired scroll mode and screen scroll direction to be selected through simple manipulations of the rotary dial 9 on the pager 1.

Figure 5A:
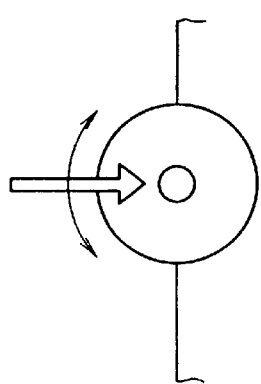
FIGS. 5A to 5C are views showing diverse dial types.
Figure 5B:
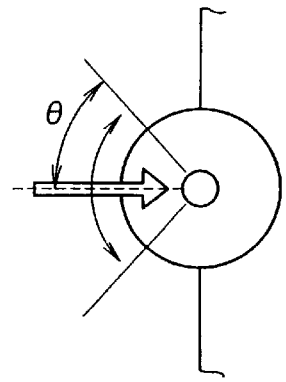
Figure 5C:
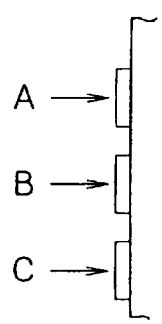

The dial is not limited to a rotary type, and the dial function may be implemented in diverse forms. As shown in FIG. 5A, a first alternative dial may be rotated continuously clockwise or counterclockwise to generate a suitable signal. A second alternative dial, as shown in FIG. 5B, may be turned by an angle θ either clockwise or counterclockwise to keep generating the same signal as that generated by the continuous rotation of the first alternative dial in a given direction. The second alternative dial may be spring-loaded so that when released by the user, it may return to its neutral position. A third alternative dial arrangement, as shown in FIG. 5C, may be composed of three pushbutton switches. Keeping one or another switch depressed may generate the same signal as that generated by continuously rotating the first alternative dial; pushing the third switch may establish what has been selected by one of the other dials.

As described and according to the invention, the portable information terminal and information scrolling method for use therewith allow a desired scroll mode and a preferred direction of information scroll to be selected by operation of the rotary dial or its equivalent on the terminal. The simple manipulations of the dial or the like to select the scroll mode and information scrolling direction afford users significantly enhanced convenience.

While preferred embodiments of the invention have been described using specific terms, such description is for illustrative purposes only. It is to be understood that changes and variations of the invention may be made without departing from the spirit or scope thereof. For example, the invention may be applied not only to the pager as described above but also to portable telephones, personal handyphone systems (PHS), radio receivers capable of receiving FM multichannel character broadcasting, personal digital assistants (PDA), and hybrid terminals combining some of these features. Thus the scope of the invention should be determined by the appended claims and their legal equivalents, rather than by the examples given.

What is claimed is:

1. A portable information terminal comprising:
    displaying means for displaying information transmitted from a transmitting station in increments of one of a plurality of lines and a plurality of screens;
    operation means for selecting a direction for scrolling through said information displayed on said displaying means; and
    controlling means for controlling said direction of an information scrolling selected by said operation means, wherein said operation means includes a spring-loaded rotary dial rotated by a predetermined angle in one of clockwise and counterclockwise directions to generate a plurality of signals for selecting a display increment of one of said plurality of lines and said plurality of screens and for selecting said direction of said information scrolling, said spring-loaded rotary dial returning to a neutral position when released by a user and said controlling means processing said plurality of signals for performing a selection by said spring-loaded rotary dial.

2. A portable information terminal comprising:
    displaying means for displaying information transmitted from a transmitting station in increments of one of a plurality of lines and a plurality of screens;
    operation means for selecting a direction for scrolling through said information displayed on said displaying means; and
    controlling means for controlling said direction of an information scrolling selected by said operation means, wherein said operation means includes a first control key, a second control key, and a third control key, said first control key and said second control key being pushed alternatively to generate a plurality of signals for selecting a display increment of one of said plurality of lines and said plurality of screens and for selecting said direction of said information scrolling, said third control key being pushed to generate a signal for performing a selection by said first control key and said second control key, and said controlling means processing said plurality of signals for performing a selection by said first control key and said second control key and processing said signal for performing a selection by said third control key.

3. The portable information terminal according to claim 1 or claim 2, wherein said portable information terminal is a pager.

4. An information scrolling method for use with a portable information terminal including displaying means for displaying information transmitted from a transmitting station in increments of one of a plurality of lines and a plurality of screens and operation means for selecting a direction for scrolling through said information, said information scrolling method comprising the step of:
    controlling said direction of an information scroll selected by said operation means, wherein said operation means includes a spring-loaded rotary dial rotated by a predetermined angle in one of clockwise and counterclockwise directions to generate a plurality of signals for selecting a display increment of one of said plurality of lines and said plurality of screens and for selecting said direction of said information scrolling, said spring-loaded rotary dial returning to a neutral position when released by a user, said information scrolling method further comprising the step of:

processing said plurality of signals for performing a selection by said spring-loaded rotary dial.

5. An information scrolling method for use with a portable information terminal including displaying means for displaying information transmitted from a transmitting station in increments of one of a plurality of lines and a plurality of screens and operation means for selecting a direction for scrolling through said information, said information scrolling method comprising the step of:

controlling said direction of an information scroll selected by said operation means;

wherein said operation means includes a first control key, a second control key, and a third control key, said first control key and said second control key being pushed alternatively to generate a plurality of signals for selecting a display increment of one of said plurality of lines and said plurality of screens and for selecting said direction of said information scrolling, said third control key being pushed to generate a signal for performing a selection by said first control key and said second control key, said information scrolling method further comprising the steps of:

processing said plurality of signals for performing a selection by said first control key and said second control key and;

processing said signal for performing a selection by said third control key.

6. The information scrolling method for use with said portable information terminal according to claim 4 or claim 5, wherein said portable information terminal is a pager.

* * * * *